Figure 1:
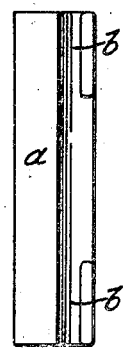

T. C. WAY.
BRAKE SHOE OF TRAMWAY AND RAILWAY VEHICLES.
APPLICATION FILED AUG. 29, 1921.

1,434,464. Patented Nov. 7, 1922.

Inventor:
Tom Chavill Way
By his Attorneys,

Patented Nov. 7, 1922.

1,434,464

UNITED STATES PATENT OFFICE.

TOM CHERRILL WAY, OF WIMBLEDON, LONDON, ENGLAND.

BRAKE SHOE OF TRAMWAY AND RAILWAY VEHICLES.

Application filed August 29, 1921. Serial No. 496,610.

(GRANTED UNDER THE PROVISIONS OF THE ACT OF MARCH 3, 1921, 41 STAT. L., 1313.)

*To all whom it may concern:*

Be it known that I, TOM CHERRILL WAY, a subject of the King of Great Britain, residing at 18 Ridgway Place, Wimbledon, London, S. W. 19, England, have invented new and useful Improvements in or Connected with the Brake Shoes of Tramway and Railway Vehicles (for which I have filed applications in Great Britain, August 27, 1918, and in France Jan. 8, 1921), of which the following is a specification.

This invention relates to improvements in or connected with the brake-shoes of tramway and railway vehicles propelled by electric power.

In many tramways worked by electrical traction in which the rate of accelaration and deceleration is high the treads of the wheel tyres and the running surface of the track rails make when new a small angle with the horizontal, and it is found that after some period of service the angles made by both have become considerably greater.

The increase of angle of these surfaces is caused in the first instance of the treads of the wheel tyres by the action of the brake-shoes when applied thereto for stopping the vehicles, and is subsequently communicated by the tyres to the rails owing to the tractive effort due to the axle torque as well as by rolling.

A brake-shoe applied to a tyre for the purpose of absorbing energy is durable in proportion to its length for any given homogeneous material. The wear caused to such brake-shoes will depend upon the pressure of application, and the distance through which rubbing takes place under such pressure between the surfaces of the brake-shoe and the tyre to which it is applied.

Usually in brake gear for tramway and railway vehicles two brake-shoes to be applied to the wheel tyres of any one axle are rigidly attached to a brake-beam by means of brake-hangers fixed to the beam, to which hangers the brake-shoes are secured by wedges or like means. When arranged in this way the surfaces of the brake-shoes brought into contact with the wheel tyres during the application of the brake are provided with no means of adjustment to the tyre contour, the two shoes being brought into parallel engagement with the tyre surfaces by means of the pull applied to the brake-beam.

When under these circumstances the tyre tread is coned as usual, that part of the brake-shoe in contact with the larger diameter of the tryre tread will be subjected to greater wear than the part of the brake-shoe engaging with the smaller diameter of the tread, with the result that when brake-shoes of uniform length throughout, are employed, the pressure between brake-shoe and tyre near the outer part of the wheel tread is increased, with consequent greater wear on this part of the tyre. Such wear is accentuated by the fact that the rate of wear on the brake-shoe is greater than that caused to the tyre owing to the disparity in area of the surfaces brought into contact during brake action.

The object of this invention is to provide means to prevent or minimize the alteration of the contour which takes place in the wheel tyres, thereby prolonging the life of the rails, and the tyres.

According to this invention I employ a brake-shoe with a surface of greater length on that side of the shoe making contact with the part of the tread next the flange, so that the arc of contact between shoe and tyre is greater near the flange than at the outer part of the tread, thereby causing less depth of wear to take place in the part of the brake-shoe nearest to the flange, and in consequence less wear relatively on the outer part of the tread of the tyre. The amount of wear on the two sides of the brake-shoe (and consequently on the two sides of the tyre) may be made to vary in relation to each other by forming the brake-shoe of such shape that as the brake-shoe wears the arc lengths of contact between the shoe and tyre at their two opposite sides may be increased or lessened relatively to each other.

Or a brake-shoe may be employed having surfaces of uniform length; the surface in contact with the tyre furthest from the flange may be lessened by making notches or holes on this side of the brake-shoe, such notches or holes being made either parallel or tapering to cause the length of shoe in contact with the tyre on its outer side to be varied if necessary during wear.

In cases in which the brake-shoe is applied to the flange as well as the tread it is desirable to decrease the wear on the flange, I therefore reduce the length of that part of the brake-shoe in contact with the flange in a similar manner and I preferably so reduce the length of surface in contact with the flange that it is less than the smallest length of surface in contact with the tread.

Figure 2:
Figure 3:
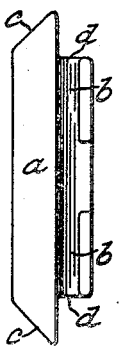
Figure 4:
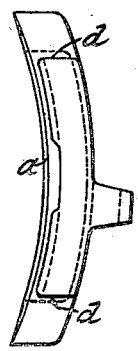
Figure 5:
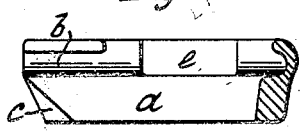
Figure 6:
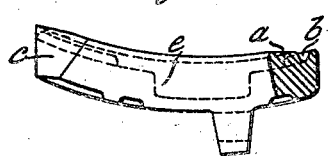
Figure 7:
Figure 8:
Figure 9:
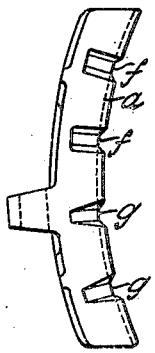
Figure 10:
Figure 11:

In the accompanying drawings, Figure 1 is a plan and Figure 7 a transverse section of brake-shoes as are usually employed with tramway vehicles. The remainder of the figures show brake-shoes made in accordance with this invention. Figure 3 is a plan and Figures 2 and 4 are side elevations and Figure 7 a transverse section of one form of brake-shoe. Figure 5 is a plan and Figure 6 a side elevation of another form of brake-shoe. Figure 10 is a plan and Figures 9 and 11 side elevations and Figure 8 a cross section of a further form of break-shoe, some of the notches cut away in Figures 9 and 10 differing from each other.

Referring to Figures 1 and 7 which show a brake-shoe of ordinary construction, the part $a$ engages with the tread of the wheel whilst a grooved part $b$ engages with the flange thereof.

In the brake-shoe shown in Figures 2, 3, 4 and 7 the ends $c$ of the part $a$ are splayed off to reduce the length of the shoe in contact with the tread of the tyre whilst the grooved part $b$ is cut away at its ends $d$.

In the brake-shoe shown in Figures 5 and 6 the parts at the ends $c$ are splayed off in such a manner as to allow the length of the part $a$ in contact with the tread to be varied as the brake-shoe wears. In these figures the length of the grooved part $b$ in contact with the flange is reduced by cutting away part of the grooved part $b$ as shown at $e$.

In Figures 8, 9, 10 and 11, the grooved part $b$ is similarly cut away at $e$ as in Figures 5 and 6, whilst notches are made in the part $a$ such notches increasing in width as they extend from the flange of the wheel. The notches may be formed with parallel sides as shown at $f$ in Figure 9, or they may be tapered in their depth as shown at $g$ in Figure 9, so as to vary the length of the part $a$ in contact with the tread of the tyre as the brake-shoe wears.

The purpose of the arrangements above described is throughout so to dispose the surface lengths of the different parts of a brake-shoe and consequently their durability, as to be approximately in proportion to the amount of wear to which they are subjected by abrasion from the tyre surface with which they are brought into contact, and thereby to prevent the consequent inequality of pressure between shoe and tyre at different parts of the width of the surfaces in contact which is caused where the two brake-shoes are rigidly attached to the brake-beam or cross member and are unable to adjust themselves to the tyre contour.

It cannot be stated definitely beforehand the amount which should be cut away from the brake-shoes so as to be suitable for all cases for that depends on the conditions such as weight and the speed of the vehicles and the quantum of energy to be absorbed by the brakes on stopping. The amount of wear caused by the deformation of the surface of the rails (especially the angle made by such surface with the horizontal) should also be taken into account. It is probable, however, that a bevel of 35-110 m/m at each end of the shoe will suffice in all the cases which may arise, the large values applying to cases in which the conditions of work are the hardest. When the shoes are applied to the flanges as well as the tyre treads it is important that the part of the shoe in contact with the flange is reduced so as to avoid undue wear of the flange and to ensure that greatest wear takes place on that part of the tyre nearest to the flange.

In railway working the usual practice is for the brake-shoes to be applied to the treads of the tyres only, the shoes not extending over the tyre flanges. The brake-shoes would consequently be formed with some small splay to their ends after the manner shown at $c$ in Figure 3, the amount of splay required depending on the conditions of working, as above referred to in the case of tramway practice. It is apparent that where the rate of deceleration is high and a large number of stops are made in relation to the mileage run, the wear of both brake-shoes and tyres due to brake action must be relatively large and the tendency to steepening of the tyre profiles from this cause can be lessened or neutralized by the adoption of suitable proportionate lengths for the brake-shoe surfaces on the lines above indicated.

What I claim is:—

1. A brake-shoe for tramway or railway vehicles, in which the length of the surface in contact with the tread of the tyre is greater on the side next the flange of the wheel than on the side farther from the flange and in which a part is cut away from the portion of the shoe in contact with the flange of the wheel.

2. A brake-shoe for tramway or railway vehicles, in which the portion of the shoe in contact with the tread of the tyre has bevelled ends and in which a part is cut away from the portion of the shoe in contact with the flange of the wheel.

3. A brake shoe for tramway or railway vehicles, in which the length of the surface in contact with the tread of the tyre is greater on the side next the flange of the wheel than on the side farther from the flange, and in which the length of the part in contact with the flange of the wheel is less than the length of the surface in contact with the part of the tread next the flange.

4. A brake shoe for tramway or railway vehicles in which the portion of the shoe in contact with the tread of the tyre has bevelled ends, and in which the length of the part in contact with the flange of the wheel is less than the length of the part in contact with the part of the tread next the flange.

In testimony that I claim the foregoing as my invention I have signed my name this 11th day of August, 1921.

TOM CHERRILL WAY.